United States Patent [19]

Reilly

[11] Patent Number: 4,796,941
[45] Date of Patent: Jan. 10, 1989

[54] TREE TRANSPORT TRAILER

[76] Inventor: Clyde L. Reilly, RR 1-Box 73, Crystal, N. Dak. 58222

[21] Appl. No.: 86,736

[22] Filed: Aug. 19, 1987

[51] Int. Cl.$^4$ .............................................. B60P 3/00
[52] U.S. Cl. ......................................... 296/3; 414/23; 298/22 D; 410/2
[58] Field of Search ....................... 414/23, 399; 410/2, 410/46; 298/22 R, 22 D; 296/3

[56] References Cited

U.S. PATENT DOCUMENTS

| | | | |
|---|---|---|---|
| 2,990,630 | 7/1961 | Crawford | 414/23 |
| 3,032,368 | 5/1962 | Sigler | 296/3 |
| 3,778,098 | 1/1973 | Tawara | 296/3 |
| 3,782,773 | 1/1974 | Mason | 296/3 |
| 4,351,253 | 9/1982 | Dahlquist | 111/2 |
| 4,604,017 | 8/1986 | Boehm | 414/23 |
| 4,709,955 | 12/1987 | Peters et al. | 296/3 |

Primary Examiner—Carlton R. Croyle
Assistant Examiner—Leonard P. Walnoha
Attorney, Agent, or Firm—Merchant, Gould, Smith, Edell, Welter & Schmidt

[57] ABSTRACT

An improved tree transport trailer (10) which is adapted for use with hydraulic tree spades without additional jacks or reinforcement, comprises a frame (12) and a plurality of carriers (34 and 36) mounted for pivotal movement about offset axes (40, 44) between a loading/unloading position in direct stopped engagement with the underlying surface and a transport position out of engagement therewith. An actuator (46) is provided for effecting pivotal actuation of the carriers. A trailer (80) incorporating a second embodiment with independently actuated pivotal carriers (96) is disclosed.

14 Claims, 3 Drawing Sheets

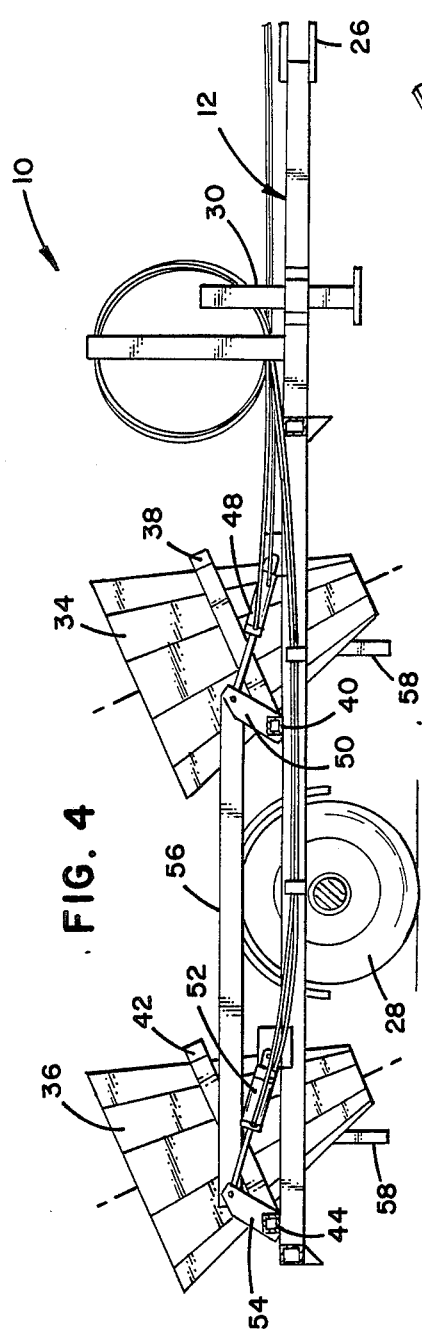
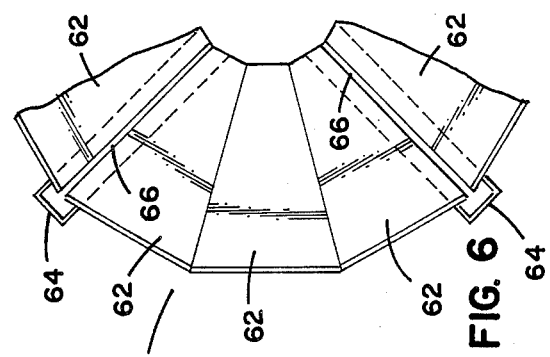
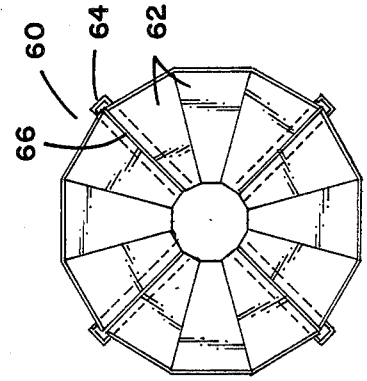
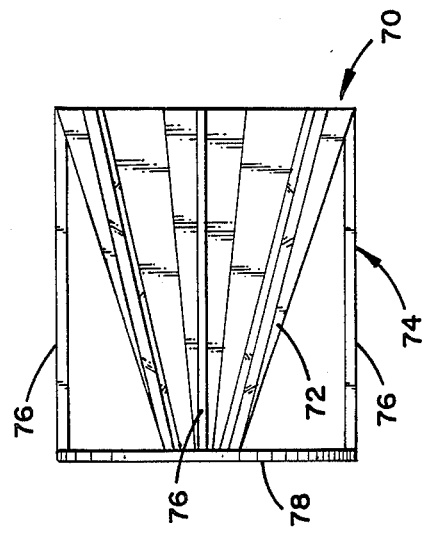

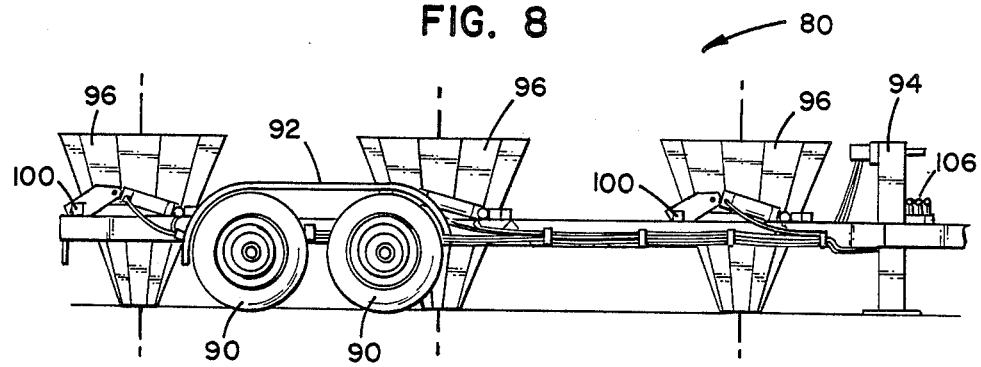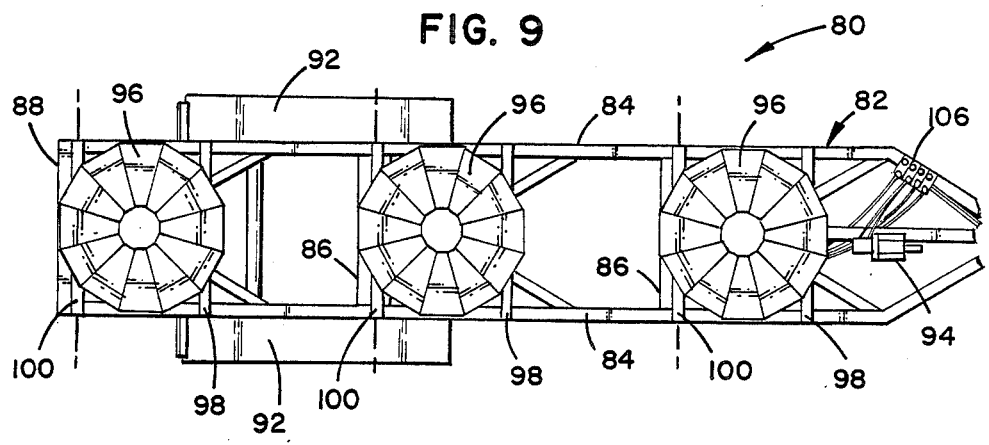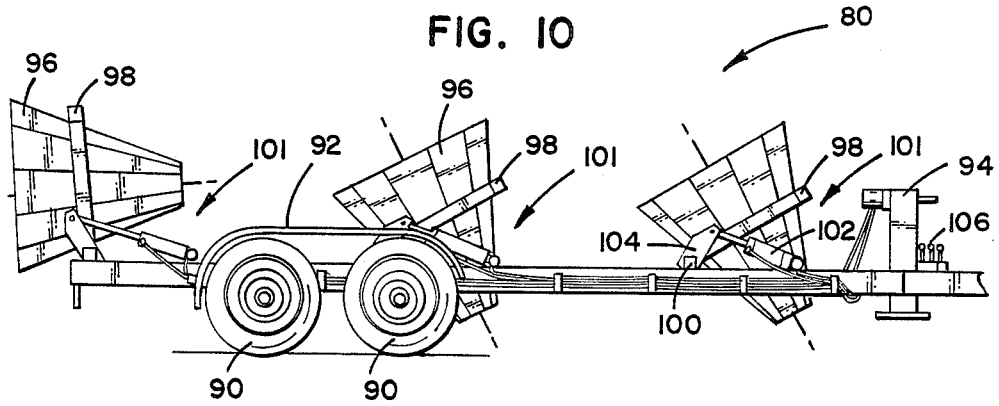

TREE TRANSPORT TRAILER

TECHNICAL FIELD

The present invention relates generally to a trailer, and more particularly to a trailer having a plurality of pivotal buckets or carriers for holding trees for transplantation.

BACKGROUND ART

Powered devices have been developed for digging and/or transplanting individual trees and the like, which would otherwise be a laborious and time-consuming task. Such devices are commonly referred to as "tree spades" and are available from the Vermeer Mfg. Co., of Pella, Iowa, and Big John Mfg. Co. of Little Rock, Arkansas. Tree spades generally include hydraulically actuated blades arranged in a generally conical pattern pivoted about a horizontal axis on the back of a trailer or truck. However, such tree spades are limited to transporting a single tree per trip and if multiple trips are required and/or some distance is involved, it will be appreciated that this can be both expensive and time-consuming.

Trailers for transporting multiple trees have been available heretofore. For example, U.S. Pat. No. 3,032,368 to Sigler shows a tree trailer having a plurality of freely pivotal receptacles arranged in a line, in stepwise fashion so that the trees will overlap each other for maximum overhead clearance when the receptacles are pivoted during transport. A boom is used to lift the trees onto or off of the trailer, which is not adapted for use with a hydraulic tree spade. U.S. Pat. No. 3,782,773 to Mason shows a reusable tree carrier wherein carrier devices in the form of right octagonal cones can be positioned in pivotal collars located in staggered arrangement on the trailer. Both of these trailers require some form of crane for lifting the trees or the trees and their carriers onto and off of the trailer.

Tree transport trailers which are adapted for use directly with hydraulic tree spades have also been available heretofore. For example, U.S. Pat. No. 4,351,253 to Dahlquist shows a trailer including pairs of cone shaped containers pivotal about transverse axes. U.S. Pat. No. 4,604,017 to Boehm illustrates another tree transporter wherein the containers are pivotal about diagonal, inclined axes so that the trees overlap when the containers are in the transport position, but pivot outwardly when in the loading/unloading position to facilitate cooperation with the tree spade. These trailers, however, require additional jacks and/or structural reinforcement to handle the extra loads imposed by the hydraulic tree spade. This in turn adds weight and cost, both in manufacturing and operating.

There is thus a need for a tree transport trailer of improved construction which is adapted for use directly with hydraulic tree spades, but which is designed to avoid any additional jacks or reinforcement in order to achieve cost savings, and which also is adapted for either individual or simultaneous actuation of the carriers between the loading/unloading position and the transport position.

SUMMARY OF INVENTION

The present invention comprises a tree transport trailer which overcomes the foregoing and other difficulties associated with the prior art. In accordance with the invention, there is provided a trailer which is adapted for transporting a plurality of trees, shrubs or the like with greater efficiency. The trailer herein comprises a frame which is mounted on wheels for mobility and which has a hitch at one end for connection to a truck, particularly a truck-mounted tree spade. A plurality of spacedapart carriers, which are preferably of octagonal cone-shape to facilitate use with the tree spade, are mounted on the trailer either in a row or in pairs. In contrast to the prior art, however, the carriers herein pivot about axes which are offset from their center vertical axes so that the carriers are normally urged by gravity to their loading/unloading positions, in which they directly engage the underlying ground or surface so that no jacks and little or no additional reinforcement of the trailer are necessary to accommodate the loads imposed by the hydraulic tree spade.

In the preferred embodiment, the carriers are responsive to an actuator for individual or simultaneous pivotal movement between their loaded/unloaded and transport positions.

A free-standing carrier for use with tree spade, is also disclosed.

BRIEF DESCRIPTION OF DRAWINGS

A better understanding of the invention can be had by reference to the following Detailed Description in conjunction with the accompanying Drawings, wherein:

FIG. 4 is a sectional view taken generally along lines 4—4 of FIG. 2 in the direction of the arrows showing the actuator arrangement for the carriers;

FIG. 5 is an enlarged top view of a modified pivotal carrier;

FIG. 6 is a partial enlargement of FIG. 5;

FIG. 7 is a side view of an optional free-standing carrier which can be used with the tree spade;

FIG. 8 is a side view of a tree transport trailer incorporating a second embodiment of the invention, showing the pivotal carriers in the loading/unloading position;

FIG. 9 is a top view thereof; and

FIG. 10 is a side view showing two pivotal carriers in the transport position and the other in the dump position.

DETAILED DESCRIPTION

Figure 1:
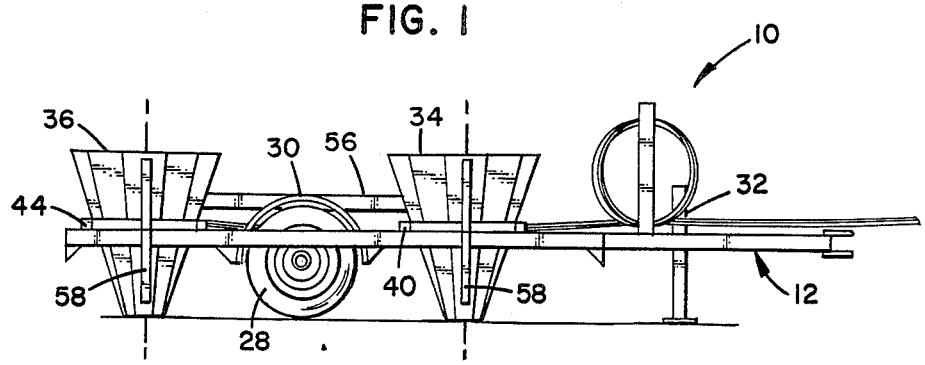
FIG. 1 is a side view of a tree-transport trailer incorporating a first embodiment of the invention, showing the pivotal carriers in the loading/unloading position.
Figure 2:
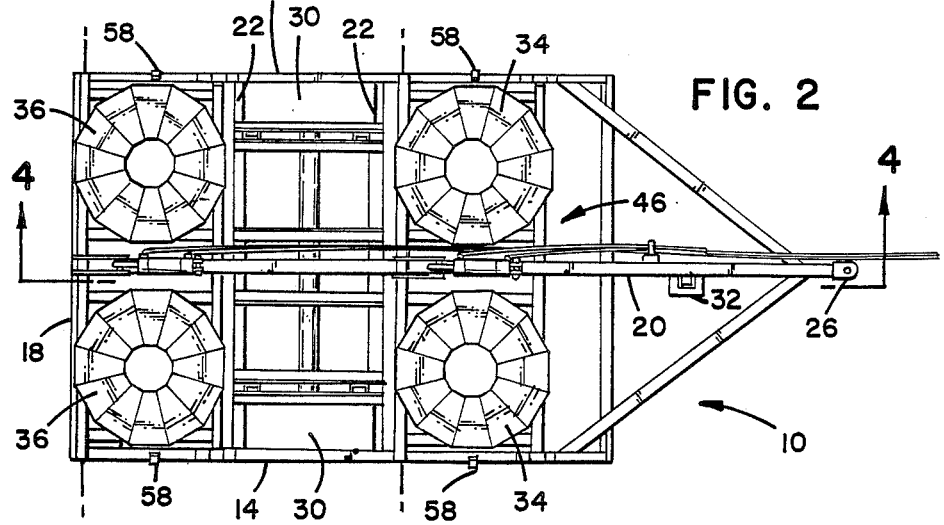
FIG. 2 is a top view.

Referring now to the Drawings, wherein like reference numerials designate like or corresponding parts throughout the views, and particularly referring to FIGS. 1 and 2, there is shown a tree transport trailer 10 incorporating a first embodiment of the invention. Trailer 10 includes a frame 12 including a pair of longitudinal side members 14, a front transverse member 16, and a rear transverse member 18. Frame 12 also includes an intermediate longitudinal member 20 and a pair of intermediate transverse members 22 and 24. The members 14–24 can be formed from steel sections welded or otherwise rigidly secured together into the frame 12. A drawbar hitch 26 is secured to the front of frame 12, and a pair of wheels 28 are provided for towing. Fenders 30 are preferably provided over wheels 28.

If desired, a jackstand 32 of either the manual crank or hydraulic type, can be provided on the frame 12 to stabilize the trailer 10 when unhitched. FIG. 1 shows the jackstand lowered, while FIG. 3 shows it raised.

A plurality of pivotal tree carriers 34 and 36 are also provided on the frame 12. The carriers 34 and 36 can be of any suitable shape. As illustrated, the carriers are preferably of generally conical shape comprising interconnected plates, to facilitate cooperation with a hydraulic tree spade. In addition, the carriers are preferably arranged in front and rear pairs as shown. The front pair of carriers 34 are mounted in U-shaped frames 38 which are secured to a pivot shaft 40 extending across the frame 12. It will be noted that the axis of the pivot shaft 40 is offset from the upright center axis of the front pair of carriers 30. The transverse portion of frames 38 opposite from the pivot shaft 40 are integral or connected for simultaneous movement, and extend over the side members 14 and intermediate longitudinal member 20 of frame 12, which thus serve as stops to limit pivotal movement thereof in one direction as will be explained more fully hereinafter. The rear pair of carriers 36 are similarly supported in U-shaped frames 42 for simultaneous pivotal movement about a pivot shaft 44.

Figure 3:
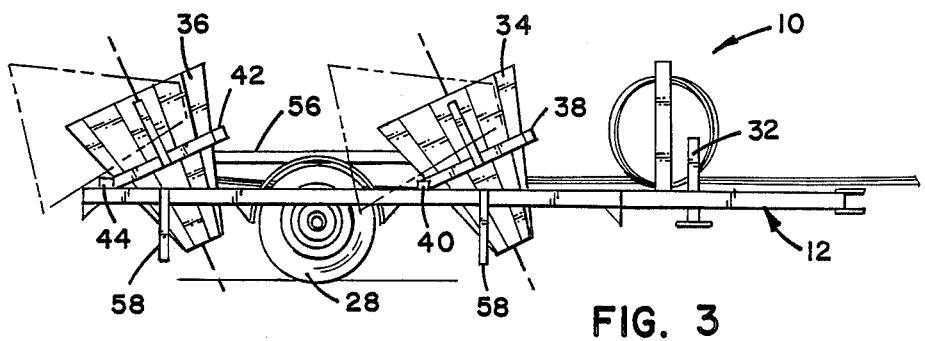
FIG. 3 is a side view showing the pivotal carriers in the transport position with the dump position shown in phantom lines.

Referring now to FIG. 3 in conjunction with FIGS. 1 and 2, it will thus be appreciated that the tree carriers 34 and 36 are mounted for pivotal movement about offset axes defined by pivot shafts 40 and 44. The offset pivot axes and center vertical axes of carriers 34 and 36 are shown in dotted lines. As illustrated, the pivot shafts 40 and 44 are transverse to frame 12 and located behind carriers 34 and 36 so that the trees (not shown) can be pivoted rearwardly during transport. If desired, however, the pivot shafts 40 and 44 could be located ahead of carriers 34 and 36 to pivot forwardly. FIG. 3 shows the carriers 34 and 36 in their up or transport positions. FIG. 1 shows them in their down or loading/unloading positions, in which it will be noted that their lower ends are in direct stopped engagement with the ground or underlying surface.

This comprises an important feature of the present invention; the tree carriers 34 and 36 being mounted on trailer 12 for pivotal movement about offset axes so that they will engage the ground or underlying surface without undue drag when moved to the loading/unloading positions. Additional loads imposed by the tree spade in loading or unloading the carriers 34 and 36 are thus transferred directly to the ground or underlying surface, thereby avoiding the need for jacks and additional reinforcement of the trailer 12 and their accompanying additional expense. Since the carriers 34 and 36 pivot about offset axes, they are normally urged by gravity to their down or loading/unloading positions as defined by the subframes 38 and 42.

Although the tree carriers 34 and 36 are mounted for pivotal movement about offset transverse axes in the preferred embodiment as shown, it will be understood that the offset axes could be oriented longitudinally, diagonally or other than transverse with the same effect, namely, that the carriers directly engage the underlying surface in their down positions.

The tree transport trailer 10 also includes an actuator 46 for actuating the carriers 34 and 36 to the upward or transport positions, as best seen in FIG. 4. The front pair of carriers 34 and rear pair 36 can be actuated independently or simultaneously, as desired, although as illustrated they are shown actuated in unison. The actuator 46 includes a cylinder 48 which is coupled at its base end to member 20 of frame 12. The rod end of cylinder 48 is coupled to a lever arm 50 secured to the pivot shaft 40 for carriers 34. Similarly, a cylinder 52 and lever arm 54 are coupled between frame 12 and the pivot shaft 44 for the rear pair of carriers 36. The lever arms 50 and 50 and 54 are coupled together by a connecting link 56. It will thus be appreciated that the tree carriers 34 and 36 are interconnected by a linkage and cylinder arrangement comprising an actuator 46 by which they can be selectively moved between the loading/unloading and transport positions.

Separate cylinders have been used for each pair of tree carriers 34 and 36 for purposes of economy and power, however, it will be understood that a single relatively larger cylinder could be used together with the connecting link 56 for effecting simultaneous actuation of all the tree carriers on trailer 10. If independent actuation of each pair of tree carriers 30 and 32 is desired, then the connecting link 56 can be omitted and cylinders 48 and 52 can be operated independently.

If desired, guards 58 can be provided on frame 12 to prevent interference and hang-up between the tree spade and trailer 10 during loading/unloading. The guards 58 can be of split construction with part being fixed to frame side members 14 and the other part being secured to the subframes 38 and 42 of the adjacent carrier 34 and 26, respectively.

FIGS. 5 and 6 illustrate a modified tree carrier 60 which can be substituted for the carriers 34 and 36 in trailer 10 or trailer 80 of the second embodiment, to be described hereinafter. The tree carriers 34 and 36 generally comprise sections of flat metal plate welded edgewise to form a truncated polygonal cone having angled corners but otherwise relatively smooth surfaces. Some tree spades, and particularly the heavy duty types, include longitudinal reinforcing ribs on the outside surfaces of their blades which can sometimes interfere with the inside surfaces of tree carriers 34 and 36 and thus impede smooth operation. The modified tree carrier 60 is especially designed for use with such reinforced tree spades. The tree carrier 60 includes flat, plates 62 arranged edge to edge in a conical configuration. Adjacent edges of some of the plates 62 are welded together, but others are positioned in spaced-apart relation and secured together by channel sections 64 welded over the open seams 66 on the outside of the tree carrier 60. Two pairs of diametrically opposite longitudinal grooves are thus provided in the sides of the tree carrier 60 for receiving any longitudinal reinforcing ribs on the outside of the blades of the tree spade to avoid excessive interference and sticking during operation.

FIG. 7 shows an optional free-standing tree carrier 70 which can be used in conjunction with the trailer 10 or in conjunction with a tree spade. It will be understood that a single tree or shrub can be transported in such a tree spade to the new site, but that unless the hole already has been dug, there must be someplace to put the tree or shrub in order to free the tree spade for digging the new hole for it. The tree stand 70 avoids the need either for an extra trip to the new site by the tree spade to dig the hole, or a wasted trip without a tree or shrub transported therein. The tree stand 70 comprises a generally conical carrier 72 and a frame 74 adapted to stand alone in free standing position directly on the ground or underlying surface. The frame 74 includes a plurality of uprights 76, only two of which are shown, and a base 78, and can be constructed from sections of tubular steel stock welded or otherwise rigidly secured together.

The carrier 72 can be constructed like carriers 34 and 36 or the modified carrier 60, as shown.

Referring to FIGS. 8-10, there is shown a tree transport trailer 80 incorporating a second embodiment of the invention. The trailer 80 includes an elongate frame 82 including a pair of longitudinal side members 84, transverse intermediate members 86, and a transverse rear member 88. A draw bar hitch (not shown) is secured to the front of frame 82, and a pair of wheels 90 are provided for towing. Fenders 92 are preferably provided for each pair of wheels. If desired, a jack stand 94 of either the manual or hydraulic type can be provided for supporting the front end of trailer 10 when unhitched from the tow vehicle. FIG. 8 shows the jackstand 94 lowered, while FIG. 10 shows it raised for travel.

A plurality of tree carriers 96 are provided in longitudinally spaced-apart relationship in a row on the frame 92. Fewer, relatively larger tree carriers are provided in the trailer 90 of the second embodiment, which is adapted to handle relatively larger trees than the trailer 10 of the first embodiment. As in the first embodiment, each tree carrier is mounted in a U-shaped subframe 98 for pivotal movement about a transverse pivot shaft 100 offset from the central axis. FIGS. 8 and 9 show carriers in their down or loading/unloading positions with their lower ends in direct engagement with the ground or underlying surface. FIG. 10 shows two of the carriers in their up or transport positions pivoted rearwardly, with the other carrier being shown in the over-center dump position to facilitate clean out and removal of any debris therefrom before reuse.

The carriers of the trailer 80 are individually actuated by actuators 101, which are similar in construction to actuator 46 of trailer 10. Each actuator 101 includes a cylinder 102 coupled between frame 82 and a lever arm 104, secured to pivot shaft 100. The controls 106 for actuators 101 and jackstand 94, which is also preferably hydraulically actuated, are located near the front of trailer 80.

From the foregoing, it will thus be appreciated that the present invention comprises an improved tree transport trailer having several advantages over the prior art, the primary one being that the positioning and mounting of the carriers facilitates use with a hydraulic tree spade without additional jacks or reinforcement of the trailer. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. A tree transport trailer, which comprises:
   a frame;
   a pair of laterally spaced-apart wheels supporting said frame for travel;
   an underlying surface supporting said wheels;
   hitch means for releasably connecting said frame to a tow vehicle;
   a plurality of tree carriers, each having a longitudinal center line extending between an open top end and a convergent bottom end, mounted in spaced-apart relationship on said frame for pivotal movement about axes offset from the center lines of said carriers between lowered positions wherein their bottom ends are supported in stopped engagement with the underlying surface for loading/unloading by a tree space, and raised positions out of engagement with the underlying surface for travel; and
   means for selectively actuating said carrier between said positions.

2. A tree transport trailer, which comprises:
   a surrounding frame;
   a pair of laterally spaced-apart wheels supporting said frame for travel;
   an underlying surface supporting said wheels;
   means for connecting said frame to a tow vehicle;
   a plurality of tree carriers positioned in spaced-apart relationship, each carrier having a longitudinal central axis extending between an open top end and a convergent bottom end;
   means for supporting each carrier on said frame for pivotal movement about a transverse axis offset from the center axis of said carriers between loading/unloading position with the bottom end thereof supported in stopped engagement with the underlying surface and a travel position with the bottom end out of engagement therewith; and
   means for selectively actuating said carriers between said positions.

3. The trailer of claim 2, wherein said frame comprises a plurality of laterally spaced-apart longitudinal members and interconnecting longitudinally spaced-apart transverse members.

4. The trailer of claim 2, wherein said tree carriers are of generally truncated cone-like shape with divergent open top end and convergent open bottom ends.

5. The trailer according to claim 4, wherein said carriers comprise generally flat plates interconnected along adjacent longitudinal edges, some of which are interconnected in spaced-apart relationship by longitudinal outside channel sections to form open inside seals for receiving any longitudinal reinforcing ribs on the blades of a tree spade.

6. The trailer of claim 2, wherein said supporting means for each carrier comprises;
   a subframe, the associated carrier being mounted therein; and
   means for securing said subframe to said frame for pivotal movement about the offset axis.

7. The trailer of claim 2, wherein said actuating means includes double acting cylinders coupled between said frame and said supporting means.

8. The trailer of claim 2, further including:
   a jackstand mounted on said frame between said wheels and said hitch means.

9. A tree transport trailer, comprising:
   a generally rectangular frame including laterally spaced-apart longitudinal members and interconnected longitudinally spaced-apart transverse members;
   means supporting said frame for travel;
   an underlying surface supporting said frame supporting means;
   means for connecting said frame to a tow vehicle;
   at least one tree carrier positioned between the longitudinal and transverse members of said frame;
   each carrier being of generally truncated cone-like shape with a longitudinal central axis extending between a divergent open top end and a convergent bottom end;

means supporting each carrier on said frame for pivotal movement about a transverse axis offset from the center axis thereof between a loading/unloading position with its bottom end in stopped supporting engagement with the underlying surface, and a travel position with its bottom end out of engagement with the underlying surface; and means for selectively actuating said carriers between the loading/unloading and travel positions.

10. The trailer of claim 9, wherein a plurality of tree carriers are arranged one behind the other in line on said frame.

11. The trailer of claim 9, wherein a plurality of tree carriers are arranged on said frame in at least one laterally spaced-apart pair.

12. The trailer of claim 9, wherein each tree carrier comprises:

a plurality of plates, each plate having opposite longitudinal edges and inside and outside surfaces;

said plates being arranged with the longitudinal edges of adjacent plates in spaced-apart relationship; and longitudinal channel sections secured to the outside surfaces of adjacent plates to form open inside seals extending inward from the open top end of said tree carrier for receiving any longitudinal reinforcing ribs on the blades of a tree spade.

13. The trailer of claim 9, wherein said supporting means for each carrier comprises:

a subframe, the associated tree carrier being mounted therein; and means for securing said subframe to said frame for pivotal movement about the respective offset axis.

14. The trailer according to claim 13, wherein said actuating means includes a double-acting cylinder coupled between said frame and subframe, and further including:

means interconnecting adjacent subframes for pivotal movement in unison.

* * * * *